(12) United States Patent
Ryan et al.

(10) Patent No.: US 8,442,851 B2
(45) Date of Patent: May 14, 2013

(54) PROVIDING FEEDBACK TO A CHAIRPERSON IN AN ELECTRONIC MEETING SCHEDULING SYSTEM IN ORDER TO ENABLE IMPROVED MEETING RESOURCE MANAGEMENT

(75) Inventors: Corinne M. Ryan, Westford, MA (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1187 days.

(21) Appl. No.: 11/780,566

(22) Filed: Jul. 20, 2007

(65) Prior Publication Data
US 2009/0024439 A1  Jan. 22, 2009

(51) Int. Cl.
*G06Q 10/00* (2012.01)

(52) U.S. Cl.
USPC ....... 705/7.19; 705/7.16; 705/7.17; 705/7.21; 705/7.24; 705/7.25; 379/202.01; 379/205.01

(58) Field of Classification Search .......... None
See application file for complete search history.

(56) References Cited

U.S. PATENT DOCUMENTS

| | | | | |
|---|---|---|---|---|
| 6,016,478 | A * | 1/2000 | Zhang et al. | 705/7.19 |
| 6,505,167 | B1 * | 1/2003 | Horvitz et al. | 705/7.21 |
| 7,158,798 | B2 * | 1/2007 | Lee et al. | 455/456.3 |
| 7,567,662 | B1 * | 7/2009 | Renner et al. | 379/202.01 |
| 2002/0034288 | A1 | 3/2002 | Hagebarth et al. | |
| 2003/0204474 | A1 | 10/2003 | Capek et al. | |
| 2003/0233265 | A1 * | 12/2003 | Lee et al. | 705/8 |
| 2004/0010548 | A1 * | 1/2004 | Hamilton et al. | 709/204 |
| 2004/0044673 | A1 * | 3/2004 | Brady et al. | 707/100 |
| 2004/0064355 | A1 * | 4/2004 | Dorenbosch et al. | 705/9 |
| 2004/0093290 | A1 * | 5/2004 | Doss et al. | 705/35 |
| 2004/0215498 | A1 * | 10/2004 | Leist | 705/8 |
| 2005/0165631 | A1 * | 7/2005 | Horvitz | 705/7 |
| 2006/0062367 | A1 * | 3/2006 | Christenson et al. | 379/202.01 |
| 2006/0143064 | A1 | 6/2006 | Mock et al. | |
| 2006/0167731 | A1 * | 7/2006 | Nishimura et al. | 705/8 |
| 2006/0187859 | A1 * | 8/2006 | Shaffer et al. | 370/260 |

(Continued)

FOREIGN PATENT DOCUMENTS

| | | |
|---|---|---|
| EP | 0969687 A1 | 1/2000 |
| JP | 2004005652 A | 1/2004 |

OTHER PUBLICATIONS

Sen, Sandip, Durfee, Edmund H. "A formal study of distributed meeting scheduling" Group decision and negotiation, Kluwer Academic Publishers, 7:265-289, 1998.*

*Primary Examiner* — Jonathan G Sterrett
*Assistant Examiner* — Tzu-Hsiang Lan
(74) *Attorney, Agent, or Firm* — David A. Dagg

(57) ABSTRACT

A system for providing feedback to a chairperson in an electronic meeting scheduling system to enable improved meeting resource management, in which a chairperson can indicate the attendance modes that are permitted for specific invitees to a meeting. The meeting invitations indicate to the invitees the attendance modes they are permitted to use. Meeting invitees are presented with user interface options allowing them to select from potentially multiple attendance modes, determined in response to inputs from the chairperson, and/or in response to information describing resources. As meeting resources are allocated to accepting invitees, those resources become unavailable for selection by subsequently accepting invitees. Meeting acceptances are collected such that indications of how accepting attendees will attend the meeting are made available in a chairperson interface so that the chairperson can adjust resources allocated for the meeting to reflect how accepting attendees are planning to attend.

11 Claims, 4 Drawing Sheets

U.S. PATENT DOCUMENTS

| | | | |
|---|---|---|---|
| 2006/0200374 A1* | 9/2006 | Nelken | 705/9 |
| 2006/0239212 A1 | 10/2006 | Pirzada | |
| 2006/0293943 A1* | 12/2006 | Tischhauser et al. | 705/9 |
| 2008/0086512 A1* | 4/2008 | Fahys | 707/104.1 |
| 2008/0091504 A1* | 4/2008 | Lyle et al. | 705/9 |
| 2008/0195448 A1* | 8/2008 | May | 705/8 |
| 2009/0006161 A1* | 1/2009 | Chen et al. | 705/8 |
| 2009/0018887 A1* | 1/2009 | Bank et al. | 705/8 |

\* cited by examiner

PROVIDING FEEDBACK TO A CHAIRPERSON IN AN ELECTRONIC MEETING SCHEDULING SYSTEM IN ORDER TO ENABLE IMPROVED MEETING RESOURCE MANAGEMENT

FIELD OF THE INVENTION

The present invention relates generally to computer based meeting scheduling systems, and more specifically to a method and system for providing feedback to a chairperson in an electronic meeting scheduling system in order to enable improved meeting resource management.

BACKGROUND OF THE INVENTION

Electronic calendars are being used by an increasing number of users to keep track of a wide variety of events, including various types of meetings. Existing electronic calendars can be set up to alert a user at specified times regarding events in their schedule. In addition, some existing systems support group calendaring operations including alerting an entire user group with regard to group events, allowing group members to view other group members schedules, and group scheduling actions that support setting up meetings with group members. In such systems, meeting invitations may be conveyed by electronic mail or through some other method, and allow invitees to accept or decline the invitations. User interface views provided in existing electronic calendars also generally include screens showing day, week and month schedules. For purposes of explanation, a user that sets up and controls parameters associated with a given meeting scheduled through an electronic scheduling system is referred to herein as the "chairperson" for that meeting.

Existing electronic calendar systems allow the chairperson for a meeting to conveniently determine those invitees that have accepted, not responded, or declined a meeting invitation. However, a significant shortcoming of existing systems results from their lack of support for determining how invitees plan to attend a given meeting (i.e. their planned "mode" of attendance). For example, existing systems do not include mechanisms that allow a chairperson to determine which invitees plan to attend by phone and which invitees plan to attend in person. As a result, situations may often arise in which the number of attendees participating by a given mode of attendance (e.g. calling in), exceeds the number of attendees that can be supported by the resources reserved for the meeting (e.g. call in lines). Such situations may result in potentially many invitees from successfully attending the meeting.

For the reasons stated above and others, it would accordingly be desirable to have a new system for electronic calendaring that enables a chairperson to conveniently access information regarding the attendance modes of invitees and to adjust the resources allocated for a given meeting in response to such information.

SUMMARY OF THE INVENTION

In order to address the above described and other shortcomings of previous techniques, a new method and system for providing feedback to a chairperson in an electronic meeting scheduling system in order to enable improved meeting resource management. In first aspect of the disclosed system, a chairperson can indicate the attendance modes that are permitted for specific invitees to a meeting. The meeting invitations generated in such an embodiment of the disclosed system indicate to the invitees the attendance modes they are permitted to use. In this way, for example, the chairperson can require certain invitees to attend in person, and require other invitees to attend by phone.

In another aspect of the disclosed system, meeting invitees are presented with user interface options allowing them to select which attendance mode they prefer to use to attend a meeting. The set of permitted attendance modes from which an invitee can select for a given meeting may be determined in response to inputs from the chairperson, and/or in response to information describing resources available for a given room or rooms in which the meeting is to be held. In one embodiment of the disclosed system, as meeting resources are allocated to accepting invitees, those resources become unavailable for selection by subsequently accepting invitees. For example, in the case where a meeting is scheduled to be held in a set of multiple rooms, when the number of attendees accepting their invitations and indicating attendance in a given one of those rooms reaches the capacity of that room, subsequently accepting invitees are no longer allowed to select the option of attending in person in that room. Similarly, when a meeting is held in a single room, when the number of accepting attendees reaches the capacity of that room, subsequently accepting attendees may be required to indicate that they will attend by calling in to the meeting.

Meeting acceptances are collected by the disclosed system such that indications of how accepting attendees will attend the meeting are conveniently made available for inspection by the chairperson through a user interface. Based on these indications, the chairperson can adjust the amount of resources allocated for the meeting (e.g. phone lines, conference rooms, etc.) to better reflect how the accepting attendees are planning to attend.

Thus there is disclosed a new system for electronic calendaring that enables a chairperson to conveniently access information regarding the attendance modes of invitees and to adjust the resources allocated for a given meeting in response to such information.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
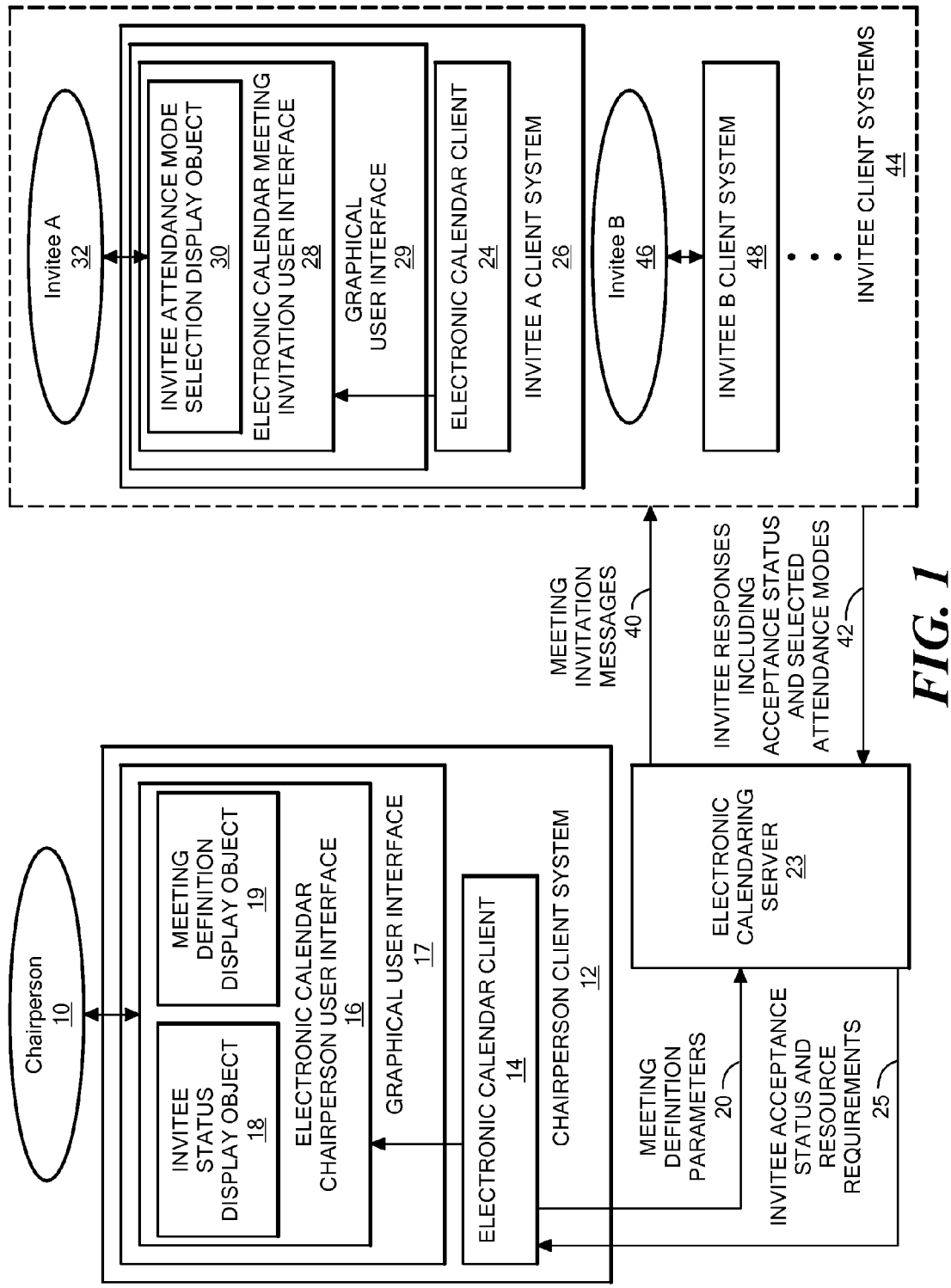
FIG. 1 is a block diagram showing software and/or hardware components in an illustrative embodiment of the disclosed system.

FIG. 1 is a block diagram showing software and/or hardware components in an illustrative embodiment of the disclosed system. As shown in FIG. 1, in an illustrative embodiment, a Chairperson 10 is provided an Electronic Calendar Chairperson User Interface 16 within a Graphical User Interface 17. The Electronic Calendar Chairperson User Interface 16 is generated by an Electronic Calendar Client 14 within the Chairperson Client System 12.

Further shown in the illustrative embodiment of FIG. 1, a number of Invitee Client Systems 44 are shown including at least an Invitee Client System 26 associated with an invitee user Invitee A 32, and potentially other invitee client systems associated with other invitee users, shown for purposes of illustration as Invitee B Client System 48 associated with Invitee B 46, etc. For example, the Invitee A Client System 26 includes an Electronic Calendar Client 24 that generates an Electronic Calendar Meeting Invitation User Interface 28 within a Graphical User Interface 29 accessible to Invitee A 32.

The Chairperson Client System 12 and Invitee Client Systems 44 are communicable with at least one Electronic Calendar Server System 23, for example by way of at least one data communication network such as the Internet, a Local Area Network (LAN), and/or some other specific type of data communication network.

During operation of the illustrative embodiment shown in FIG. 1, the Chairperson 10 schedules a meeting using the electronic calendar provided by the Electronic Calendar Client 14, Electronic Calendar Server 23, and electronic calendar clients in the Invitee Client Systems 44, such as Electronic Calendar Client 24. For example, the Chairperson 10 sets up the meeting parameters through the Meeting Definition Display Object 19, which may be a portion of a window display object in a multi-window graphical user interface, and includes various menus, text entry fields, etc., that allow a user such as the Chairperson 10 to define the parameters of the meeting. For example, meeting parameters defined through the Meeting Definition Display Object 19 may include the set of invitees for the meeting, the location of the meeting, the time and date of the meeting and/or alternative times and dates, the subject and/or agenda for the meeting, indications of which invitees are necessary attendees and which invitees are optional, and indication of who is to be considered the chairperson for the meeting. Alternatively, the user that sets up a meeting may automatically be defined as the chairperson for the meeting. For purposes of illustration and explanation, the chairperson for the meeting being scheduled in the example of FIG. 1 is Chairperson 10. The user defined as the meeting chairperson for a meeting may have certain control options not available to regular invitee users, such as the ability to define some or all meeting parameters. In one embodiment of the disclosed system, the chairperson has the ability to select, enter, or otherwise indicate the selectable attendance modes provided to the meeting invitees, for example as one of the meeting parameters defined through the Meeting Definition Display Object 19. Further in an embodiment of the disclosed system, the chairperson is provided with a display of the selected attendance modes for accepting meeting invitees, for example through the Invitee Status Display Object 18.

Further during operation of the illustrative embodiment shown in FIG. 1, the Meeting Definition Parameters 20 collected from the Chairperson 10 by the Electronic Calendar Client 14 through the Meeting Definition Display Object 19 are sent from the Chairperson Client System 12 to the Electronic Calendar Server 23. The Electronic Calendaring Server 23 then generates a number of Meeting Invitation Messages 40 based on and reflecting the Meeting Definition Parameters 20. The Meeting Invitation Messages 40 are sent to invitees indicated in the Meeting Definition Parameters 20, e.g. users associated with the Invitee Client Systems 44 such as Invitee A 32, Invitee B 46, etc. In response to receipt of the Meeting Invitation Messages 40, the Invitee Client Systems 44 generate user interface objects (e.g. Electronic Calendar Meeting Invitation User Interface 28) to their respective users including information regarding the meeting (e.g. by displaying one or more of Meeting Definition Parameters 20), and allowing the respective invitees to accept or decline the invitation. In the disclosed system, the meeting invitees (e.g. Invitee A 32, Invitee B 46, etc.), are provided with selectable attendance mode options. For example, Invitee A 32 is provided with a number of selectable attendance mode options through menus, check boxes, or other user interface constructs displayed within the Invitee Attendance Mode Selection Object 30 of the Electronic Calendar Meeting Invitation User Interface 28.

The actions performed by invitees with regard to accepting or declining the Meeting Invitation Messages 40 (e.g. for Invitee A 32 through Electronic Calendar Meeting Invitation User Interface 28), and with regard to indicating their respective attendance modes (e.g. for Invitee A 32 through the Invitee Attendance Mode Selection Display Object 30), are collected and sent back through their respective electronic calendar clients (e.g. Electronic Calendar Client 24) to the Electronic Calendar Server 23. The Electronic Calendar Server 23 then forwards data regarding meeting acceptances and attendance modes as Invitee Acceptance Status and Resource Requirements 25 to the Electronic Calendar Client 14. In response to receipt of the Invitee Acceptance Status and Resource Requirements 25, Electronic Calendar Client 14 generates the Invitee Status Display Object 18. Invitee Status Display Object 18 displays information to Chairperson 10 that helps Chairperson 10 understand whether the resources allocated to the meeting are appropriate/adequate, such as information regarding how many users have accepted their invitations, and the attendance modes of those accepting invitees. For example, the Invitee Status Display Object 18 may include or otherwise indicate the number of accepting invitees for each attendance mode, the indicated attendance mode for each accepting invitee, and/or other appropriate information, such as the number of invitees that have accepted their invitations, the number of invitees that have declined their invitations, the number of invitees that have not yet responded to their invitations, etc.

The client systems 12 and 44 of FIG. 1 may be any specific type of a computer system or intelligent electronic device, such as a desktop, laptop, or palmtop computer system, or a personal digital assistant, cell phone, or other electronic device. Each of the client systems 12 and 44 include or control a display device capable of displaying graphical user interfaces (e.g. Graphical User Interface 17 and Graphical User Interface 29) to the local users the respective client systems, such as a liquid crystal display (LCD), cathode ray tube (CRT), interferometric modulator display (IMOD), light emitting diode (LED), or the like.

Those skilled in the art will recognize that the electronic calendar clients of the illustrative embodiment shown in FIG. 1 (e.g. Electronic Calendar Client 14 and Electronic Calendar Client 24) may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the client and server systems of the illustrative embodiment shown in FIG. 1 (e.g. client systems 12 and 44 and server system 23) may each include one or more processors, and program storage, such as memory, for storing program code executable on such processors, as well as input/output devices and/or interfaces. As illustrated in FIG. 1, the client systems 12 and 44, and the server system 23, are interconnected to a computer or data communication network (e.g. the Internet, a Local Area Network, etc.) through one or more of such input/output devices or interfaces, and through which may further be provided communication to a number of other client systems and/or other server systems.

Moreover, while a specific client-server approach is shown for purposes of explanation in the illustrative embodiment of FIG. 1, the disclosed system is not limited to such an approach. Accordingly, operations described as being performed in the Electronic Calendar Server 23 may alternatively be performed within one or more of the client systems of FIG. 1 (i.e. client systems 12 and 44), and operations described as being performed within the client systems 12 and 44 may alternatively be performed within one or more server systems (e.g. Electronic Calendar Server 23). Similarly, while the illustrative embodiment of FIG. 1 shows electronic calendar clients contained within the client systems, and providing associated electronic calendar user interfaces, such user interfaces may alternatively be provided by a Web Browser application program or the like in response to Web pages received from one or more server systems (e.g. Electronic Calendar Server 23).

Figure 2:
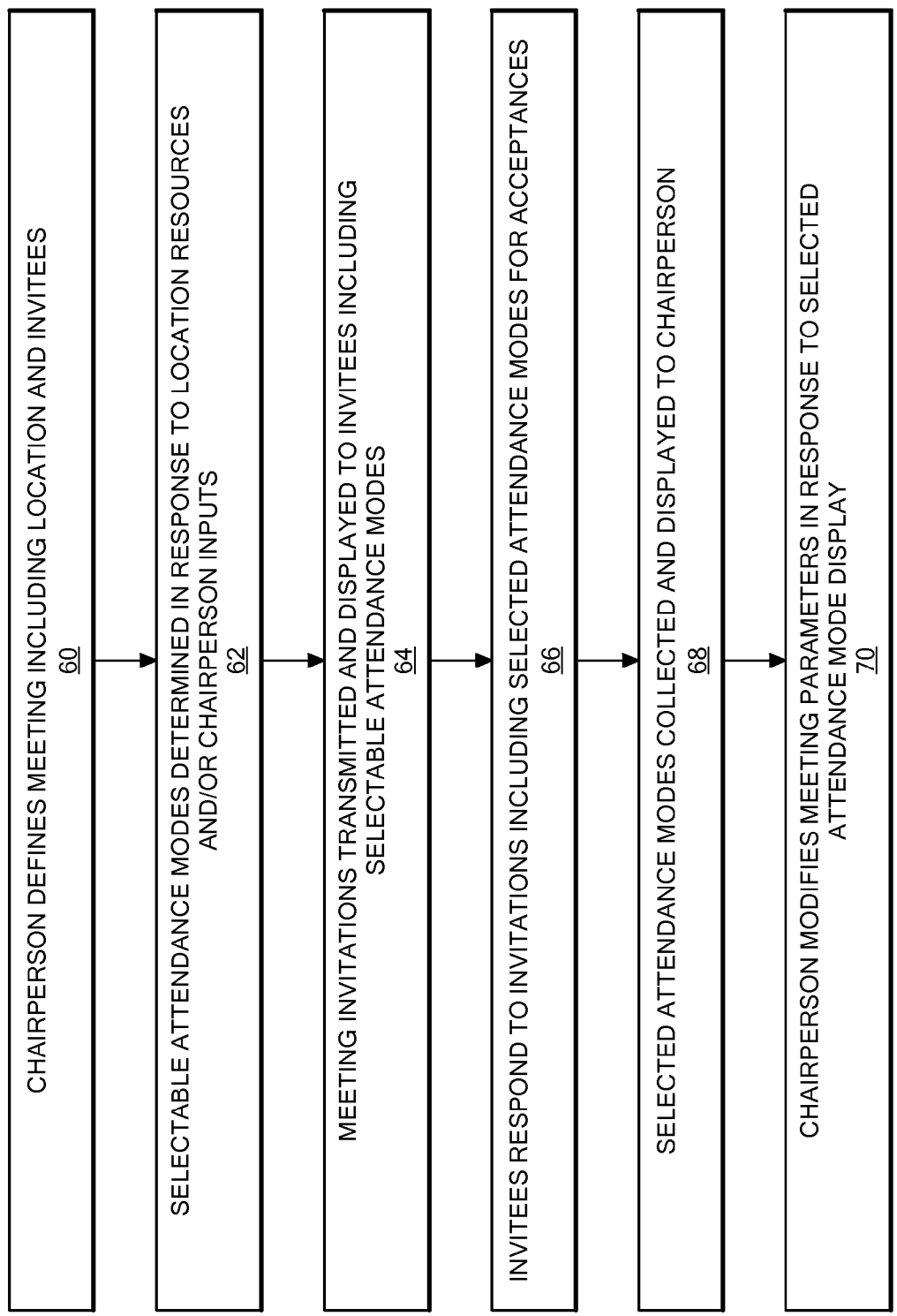
FIG. 2 is a flow chart showing steps performed during an illustrative embodiment of the disclosed system.

FIG. 2 is a flow chart showing steps performed during an illustrative embodiment of the disclosed system. As shown in FIG. 2, at step 60, the disclosed system provides a an electronic calendar user interface (e.g. Meeting Definition Display Object 19 of FIG. 1) through which a chairperson defines a meeting. Specifically, at step 60 a chairperson defines parameters associated with a meeting, including the meeting location, the invitees to the meeting, and other meeting parameters. In one embodiment, the chairperson defines the selectable attendance modes that are presented to the invitees when they receive the meeting invitation. Accordingly, for example, the chairperson can indicate at step 60 that one or more specified invitees, or a specified group of invitees, can only accept the meeting invitation by selecting a first attendance mode (e.g. attend in person), while one or more other specified invitees or invitee group is required to accept the meeting invitation by selecting another attendance mode (e.g. attend by phone).

At step 62, the disclosed system operates to determine the selectable attendance modes for the invitations to be sent to the meeting invitees. For example, the selectable attendance modes determined at step 62 may reflect chairperson inputs within the parameters for the meeting obtained at step 60. Alternatively, or in addition, at step 62 the disclosed system may determine the selectable attendance modes to be presented to the meeting invitees based on resource information associated with a location for the meeting. Such resource information may, for example, include the number of call-in lines available for a conference room that is the location of the meeting, and/or other resource information describing the resource limitations of the meeting location.

A single set of selectable attendance modes may be determined at step 62 and applied across invitees. Alternatively, multiple sets of selectable attendance modes may defined at step 62, and applied to indicated invitee sets or to individual invitees. This enables the chairperson to require certain relatively more important invitees to attend using a specific attendance mode (e.g. in person, etc.), and/or to be sure that meeting room resources are allocated to relatively more important invitees.

The set or sets of selectable attendance modes determined at step 62 may further reflect the contents of previous invitation acceptances and the selected attendance modes therein. For example, as invitees accept their invitations and indicate how they will attend, the capacity of one or more meeting resources (e.g. meeting room capacity for accepting invitees that will attend in person, phone line capacity of a meeting room for accepting invitees that will be calling in, etc.) may be reached. In such a case, the selectable attendance mode supported by the resource whose capacity has been reached is no longer made available to invitees that have not yet been sent invitations, and/or to invitees that have not yet responded to their invitations. For example, in the case where the capacity of a meeting room has been reached, then subsequently accepting invitees are not presented with the selectable attendance mode option of attending the meeting in person. Similarly, in the case where the phone in capacity for a meeting has been reached, subsequently accepting invitees are not presented with the selectable attendance mode option of attending by a calling in to the meeting, and so on.

Moreover, in the case where a meeting is being held across multiple locations (e.g. in multiple conference rooms in one or more buildings), when the number of invitee acceptances indicating attendance in a given one of the locations reaches the capacity of that location, then subsequently accepting invitees are only allowed to select an in-person attendance mode for one of the other locations.

As attendance modes become "unselectable", they may either be removed from the list of selectable attendance modes, grayed out within the list of selectable acceptance modes, or removed or made un-selectable in some other way, as appropriate for a given embodiment.

At step 64, meeting invitations reflecting the meeting parameters defined at step 60 and the set or sets of selectable attendance modes for each invitee are transmitted at step 62, e.g. through electronic mail or some other appropriate communication mechanism. Further at step 64, the meeting invitations are displayed to the invitee users with the selectable attendance modes determined at step 62 (e.g. in Invitee Attendance Mode Selection Display Object 30 within Electronic Calendar Meeting Invitation User Interface 28).

At step 66, the disclosed system captures invitee responses to the meeting invitations, including the attendance modes selected by those invitees that are accepting the meeting invitation. The selected attendance modes captured at step 66 are collected for all accepting invitees (e.g. by Electronic Calendaring Server 23), and are displayed to the chairperson (e.g. through Invitee Status Display Object 18). The chairperson can then inspect the selected attendance modes for all accepting invitees at a given point in time (e.g. through the Invitee Status Display Object 18), and modify meeting parameters at step 70 as needed to accommodate the ways the accepting invitees have decided to attend the meeting (e.g. through the Meeting Definition Display Object 19).

Figure 3:
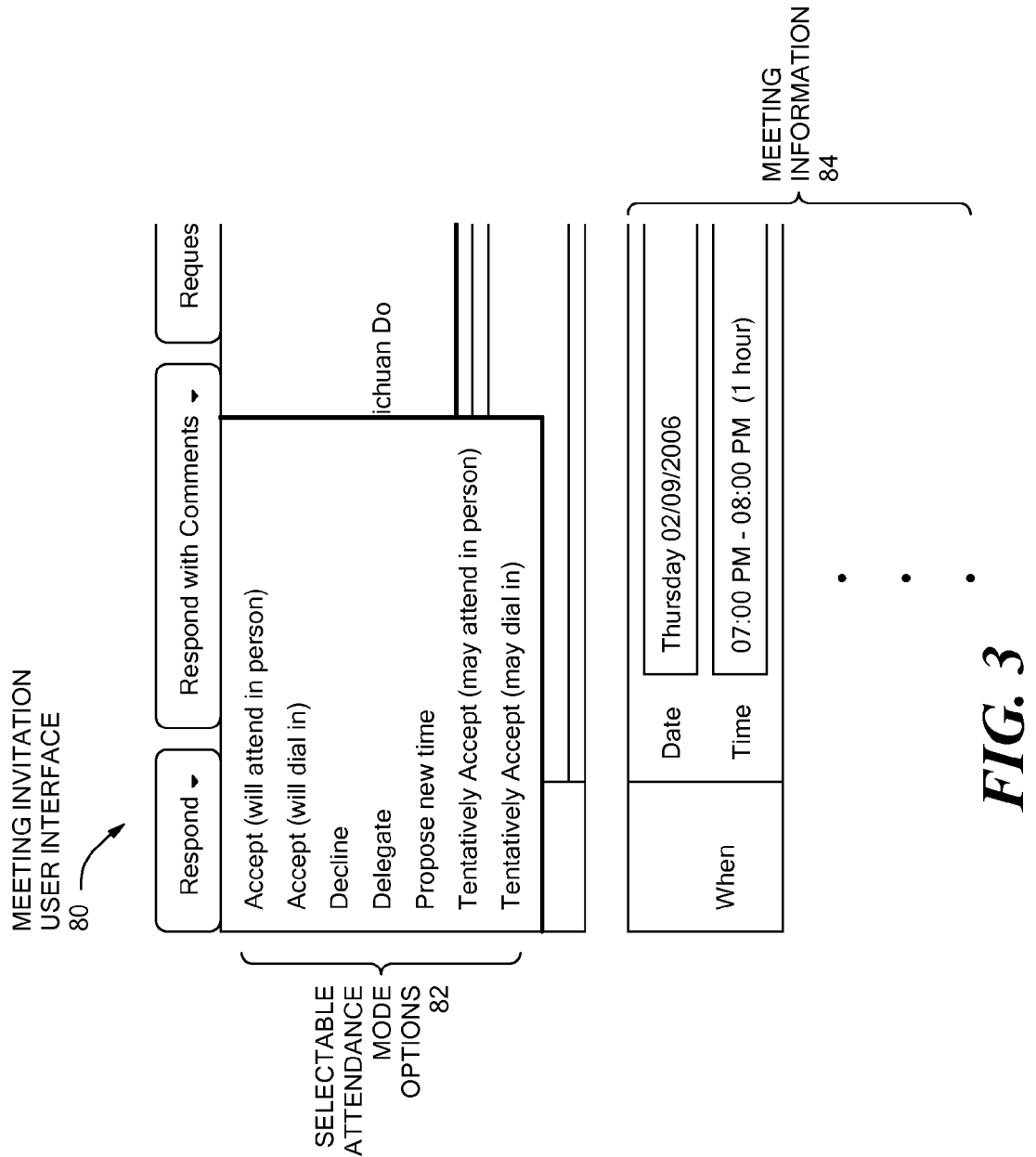
FIG. 3 is a simplified screen shot showing a portion of a meeting invitation user interface object created in a graphical user interface of an illustrative embodiment of the disclosed system.

FIG. 3 is a simplified screen shot showing a portion of a Meeting Invitation User Interface Object 80 created in a graphical user interface of an illustrative embodiment of the disclosed system. The Meeting Invitation User Interface Object 80 is an example of the Electronic Calendar Meeting Invitation User Interface 28 shown in FIG. 1.

As shown in FIG. 3, the Meeting Invitation User Interface 80 includes a drop-down menu of Selectable Attendance Mode Options 82. By clicking on one of the Selectable Attendance Mode Options 82, a meeting invitee can indicate whether they accept the invitation or decline, and also indicate how they will be attending the meeting if they accept. For example, the Selectable Attendance Mode Options 82 allow the invitee receiving the meeting invitation to accept and indicate they will attend the meeting in person, accept and indicate that they will dial in to the meeting using a call in number, decline the invitation, delegate their invitation to another person, propose a new time for the meeting, tentatively accept the invitation to attend in person, or tentatively accept the invitation to dial in to the meeting using a call in number. The Selectable Attendance Mode Options 82 shown in FIG. 3 are only for purposes of illustration and explanation, and the disclosed system is not limited to embodiments using that specific set of options. Accordingly, alternative embodiments may include other selectable attendance mode options, such as, for example, attend via telecom hook-up, attend via on-line conferencing software, etc. Moreover, the selectable attendance modes may further be embodied to meet specific meeting type requirements. For example, in the case of sending invitations to an instructional meeting, the selectable attendance modes may include options for an invitee to indicate that they will attend with their lap-top computer, attend without their lap-top computer, and/or other instructional meeting specific selectable attendance modes. Meeting Invitation User Interface 80 of FIG. 3 further displays Meeting Information 84 that may include any specific meeting parameters, such as location(s), time and date, chairperson name, meeting subject and agenda, and/or any other specific information associated with the meeting.

Figure 4:
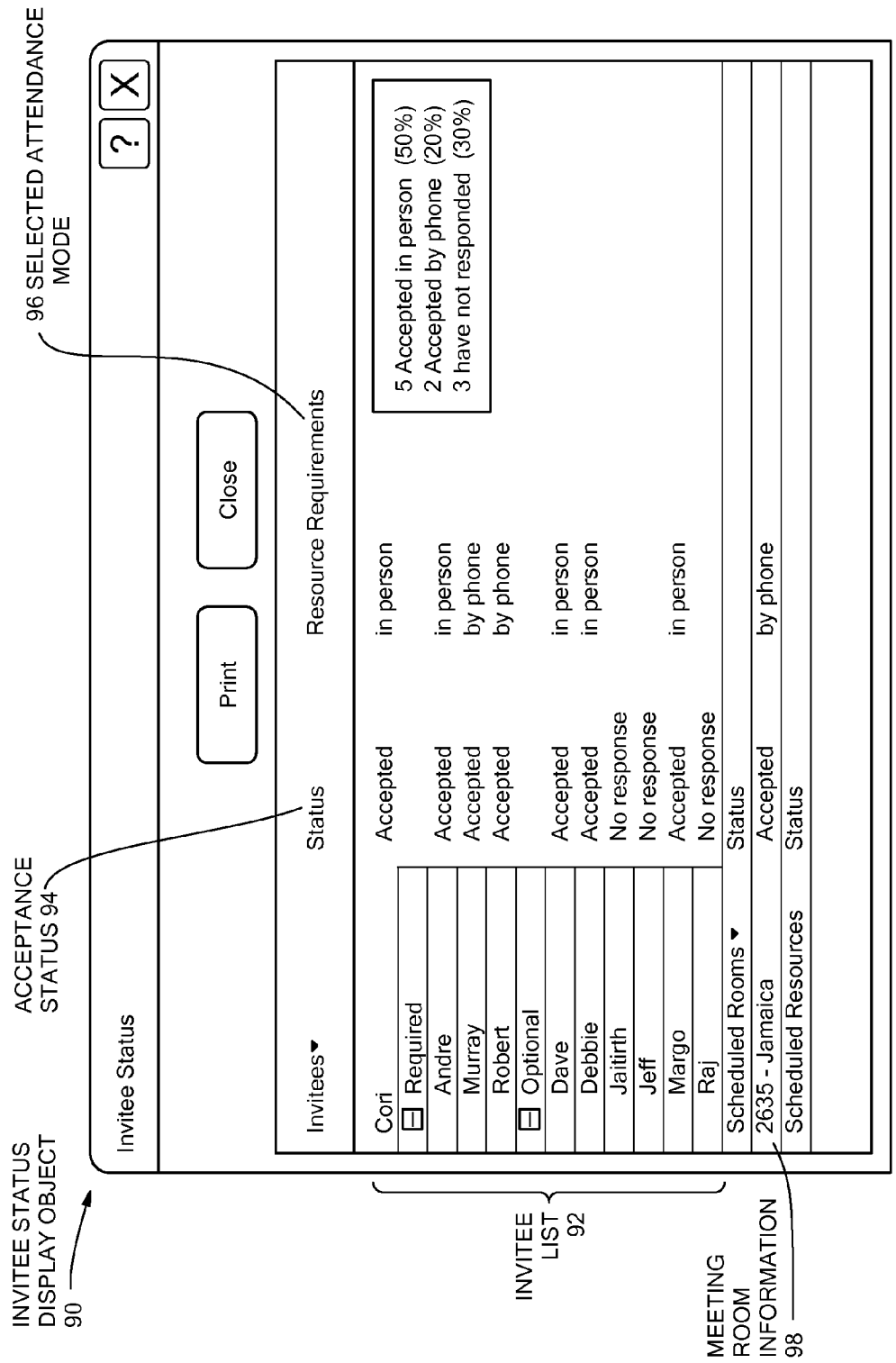
FIG. 4 is a simplified screen shot showing an example of an invitee status display object created in a graphical user interface of an illustrative embodiment of the disclosed system.

FIG. 4 is a simplified screen shot showing an example of an Invitee Status Display Object 90 created in a graphical user interface of an illustrative embodiment of the disclosed system. The Invitee Status Display Object 90 is an example of the Invitee Status Display Object 18 of FIG. 1.

As shown in FIG. 4, the Invitee Status Display Object 90 includes an Invitee List 92 containing entries corresponding to each meeting invitee. In the example of FIG. 4, the invitees are organized into "Required" and "Optional" groups in the Invitee List 92. The contents of an "Acceptance Status" column 94 indicates for each invitee whether they have accepted or declined the meeting invitation. A "Selected Attendance Mode" column 96 indicates which selectable attendance mode the corresponding invitee has selected. An Acceptance Summary area 99 displays information describing total numbers and percentages of invitees that have accepted and indicated specific attendance modes.

A Meeting Room Information section 98 provides access to a modifiable parameter of the meeting, i.e. the meeting room scheduled for the meeting. For example, as shown in FIG. 4, the Meeting Room section 98 displays the meeting room scheduled for the meeting, shown for purposes of illustration as the meeting room "Jamaica". The chairperson can accordingly change the meeting room scheduled for the meeting by selecting another meeting room instead of "Jamaica", for example through a pull down menu listing the available meeting rooms or the like. Other meeting parameters may similarly be accessed (i.e. displayed to and modified by the user) in alternative embodiments of the Invitee Status Display Object 90, and the Meeting Room Information section 98 is accordingly an illustrative example of an aspect or portion of the Meeting Definition Display Object 19 of FIG. 1. Similarly, the Invitee Status Display Object 90 may further include visual indications (e.g. icons or other visual indications) indicating that specific invitees were sent invitations restricting the acceptance modes from which they may select, e.g. limiting acceptance to attendance by phone, limiting acceptance to attendance in person, etc.

Moreover, while the above description regarding illustrative embodiments of the disclosed system includes examples of specific user interface display objects, which may be embodied as menus, graphical buttons, dialog boxes, and the like, and/or combinations thereof, the present invention is not limited to the specific examples above. Accordingly, those skilled in the art will recognize that alternative embodiments may use any specific type or kind of user interface display object that may be appropriate to accomplish the necessary operations.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for providing feedback to a chairperson user in an electronic meeting scheduling system, comprising:

displaying, by at least one computer system having at least one processor and a memory, a chairperson meeting definition user interface through which said chairperson user can define parameters associated with a meeting, said meeting parameters including a location for the meeting, a plurality of invitees for the meeting, and multiple invitee-selectable attendance mode options, wherein each one of said invitee-selectable attendance mode options has associated with it a resource and a capacity of said associated resource, and wherein said invitee-selectable attendance mode options include at least an in person attendance mode and a by phone attendance mode;

receiving, by said at least one computer system through said chairperson meeting definition user interface, said parameters associated with said meeting defined by said chairperson user;

distributing, by said at least one computer system, responsive to said parameters associated with said meeting defined by said chairperson user, electronic invitations to a plurality of invitees for a meeting, wherein each invitation, when displayed to each one of said invitees, displays said multiple invitee-selectable attendance mode options to said invitee;

detecting, by said at least one computer system, selection of a first one of said attendance mode options presented in said electronic invitations by a number of said invitees at least equal to a capacity of a resource associated with a first one of said attendance mode options;

in response to said detecting said selection of said first one of said attendance mode options by said number of invitees equal to said capacity of said resource associated with said first one of said first one of said attendance mode options, automatically preventing, by said at least one computer system, other invitees from subsequently selecting said first one of said attendance mode options in respective ones of said electronic invitations;

collecting, by said at least one computer system, indications of which of said multiple invitee-selectable attendance mode options were selected by each individual one of said plurality of invitees through said electronic invitations;

sending, by said at least one computer system, said indications of which of said multiple invitee-selectable attendance mode options were selected by said individual invitees to a chairperson client system; and displaying, by said at least one computer system, said indications of which of said multiple invitee-selectable attendance mode options were selected by said individual invitees to said chairperson user, said displaying including displaying total numbers and percentages of said invitees that have selected each individual one of said invitee selectable attendance mode options together with at least one option for changing said at least one resource associated with at least one of said invitee-selectable attendance mode options.

2. The method of claim 1, further comprising:
wherein said meeting parameters further include permitted attendance modes for specific invitees to said meeting; and
wherein said invitee-selectable attendance mode options for each of said invitees is determined responsive to said permitted attendance mode options for that individual invitee.

3. The method of claim 1, wherein said invitee-selectable attendance mode options for each of said invitees are determined further responsive to a set of resources available for said meeting.

4. The method of claim 1, wherein said invitee-selectable attendance mode options further comprise an in person attendance mode associated with a first of a plurality of rooms in which said meeting is to be held and an in person attendance mode associated with a second of said plurality of rooms in which said meeting is to be held.

5. The method of claim 1, wherein said at least one option for changing said resource associated with at least one of said invitee-selectable attendance mode options comprises a user interface object through which said chairperson user can modify a location of said meeting.

6. An apparatus including a non-transitory computer readable medium, said computer readable medium having stored thereon program code operable to cause a computer system to provide feedback to a chairperson user in an electronic meeting scheduling system, comprising:

program code for displaying a chairperson meeting definition user interface through which said chairperson user can define parameters associated with a meeting, said meeting parameters including a location for the meeting, a plurality of invitees for the meeting, and multiple invitee-selectable attendance mode options, wherein each one of said invitee-selectable attendance mode options has associated with it a resource and a capacity of said associated resource, and wherein said invitee-selectable attendance mode options include at least an in person attendance mode and a by phone attendance mode;

program code for receiving, by said at least one computer system through said chairperson meeting definition user interface, said parameters associated with said meeting defined by said chairperson user;

program code for distributing, responsive to said parameters associated with said meeting defined by said chairperson user, electronic invitations to a plurality of invitees for a meeting, wherein each invitation, when displayed to each one of said invitees, displays said multiple invitee-selectable attendance mode options to said invitee;

program code for detecting selection of a first one of said attendance mode options presented in said electronic invitations by a number of said invitees at least equal to a capacity of a resource associated with a first one of said attendance mode options;

program code for, in response to said detecting said selection of said first one of said attendance mode options by said number of invitees equal to said capacity of said resource associated with said first one of said first one of said attendance mode options, automatically preventing other invitees from subsequently selecting said first one of said attendance mode options in respective ones of said electronic invitations;

program code for collecting indications of which of said multiple invitee-selectable attendance mode options were selected by each individual one of said plurality of invitees through said electronic invitations;

program code for sending said indications of which of said multiple invitee-selectable attendance mode options were selected by said individual invitees to a chairperson client system; and program code for displaying which of said multiple invitee-selectable attendance mode options were selected by said individual invitees to said chairperson user, said displaying including displaying total numbers and percentages of said invitees that have selected each individual one of said invitee selectable attendance mode options together with at least one option for changing said at least one resource associated with at least one of said invitee-selectable attendance mode options.

7. A computer program product including a non-transitory computer readable medium, said computer readable medium having stored thereon program code operable to cause a computer system to provide feedback to a chairperson user in an electronic meeting scheduling system, said program code comprising:

program code for displaying a chairperson meeting definition user interface through which said chairperson user can define parameters associated with a meeting, said meeting parameters including a location for the meeting, a plurality of invitees for the meeting, and multiple invitee-selectable attendance mode options, wherein each one of said invitee-selectable attendance mode options has associated with it a resource and a capacity of said associated resource, and wherein said invitee-selectable attendance mode options include at least an in person attendance mode and a by phone attendance mode;

program code for receiving, by said at least one computer system through said chairperson meeting definition user interface, said parameters associated with said meeting defined by said chairperson user;

program code for distributing, responsive to said parameters associated with said meeting defined by said chairperson user, electronic invitations to a plurality of invitees for a meeting, wherein each invitation, when displayed to each one of said invitees, displays said multiple invitee-selectable attendance mode options to said invitee;

program code for detecting selection of a first one of said attendance mode options presented in said electronic invitations by a number of said invitees at least equal to a capacity of a resource associated with a first one of said attendance mode options;

program code for, in response to said detecting said selection of said first one of said attendance mode options by said number of invitees equal to said capacity of said resource associated with said first one of said first one of said attendance mode options, automatically preventing other invitees from subsequently selecting said first one of said attendance mode options in respective ones of said electronic invitations;

program code for collecting indications of which of said multiple invitee-selectable attendance mode options were selected by each individual one of said plurality of invitees through said electronic invitations;

program code for sending said indications of which of said multiple invitee-selectable attendance mode options were selected by said individual invitees to a chairperson client system; and program code for displaying said indications of which of said multiple invitee-selectable attendance mode options were selected by said individual invitees to said chairperson user, said displaying including displaying total numbers and percentages of said invitees that have selected each individual one of said invitee selectable attendance mode options together with at least one option for changing said at least one resource associated with at least one of said invitee-selectable attendance mode options.

8. The apparatus of claim 6, further comprising:
wherein said meeting parameters further include permitted attendance modes for specific invitees to said meeting; and
wherein said invitee-selectable attendance mode options for each of said invitees is determined responsive to said permitted attendance mode options for that individual invitee.

9. The apparatus of claim 6, wherein said invitee-selectable attendance mode options for each of said invitees are determined further responsive to a set of resources available for said meeting.

10. The apparatus of claim 6, wherein said invitee-selectable attendance mode options further comprise an in person attendance mode associated with a first of a plurality of rooms in which said meeting is to be held and an in person attendance mode associated with a second of said plurality of rooms in which said meeting is to be held.

11. The apparatus of claim 6, wherein said at least one option for changing said resource associated with at least one of said invitee-selectable attendance mode options comprises a user interface object through which said chairperson user can modify a location of said meeting.

* * * * *